(12) United States Patent
Straub et al.

(10) Patent No.: US 7,128,027 B1
(45) Date of Patent: Oct. 31, 2006

(54) COOLING SYSTEM FOR AN OUTBOARD MOTOR

(75) Inventors: Anthony M. Straub, Fond du Lac, WI (US); Kenneth R. Seymour, II, Plymouth, WI (US); David J. Belter, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 11/364,683

(22) Filed: Feb. 28, 2006

(51) Int. Cl.
*F01P 11/08* (2006.01)

(52) U.S. Cl. .............................. 123/41.33; 123/195 R; 440/88 L; 60/320

(58) Field of Classification Search ............ 123/195 R, 123/41.33; 440/88 L, 88 C, 88 D, 88 G, 440/88 J, 88 K; 60/320
See application file for complete search history.

(56) References Cited

U.S. PATENT DOCUMENTS

| | | | |
|---|---|---|---|
| 4,498,875 A | 2/1985 | Watanabe | 440/88 |
| 4,545,332 A | 10/1985 | Suzuki et al. | 123/41.01 |
| 5,037,340 A | 8/1991 | Shibata | 440/88 |
| 5,072,809 A | 12/1991 | Shibata | 184/6.13 |
| 5,232,387 A | 8/1993 | Sumigawa | 440/88 |
| 5,462,464 A | 10/1995 | Ming | 440/88 |
| 5,487,688 A | 1/1996 | Sumigawa | 440/88 |
| 5,733,157 A | 3/1998 | Okuzawa et al. | 440/89 |
| 5,803,036 A | 9/1998 | Takahashi et al. | 123/179.25 |
| 5,937,801 A * | 8/1999 | Davis | 123/41.33 |
| 6,039,618 A * | 3/2000 | Hiraoka et al. | 440/89 R |
| 6,367,442 B1 | 4/2002 | Takayanagi | 123/196 W |
| 6,655,341 B1 | 12/2003 | Westerbeke | 123/196 R |
| 6,699,086 B1 | 3/2004 | Belter et al. | 440/88 C |
| 6,913,498 B1 | 7/2005 | Sheth | 440/88 L |
| 2004/0198110 A1* | 10/2004 | Sumigawa et al. | 440/88 L |

* cited by examiner

*Primary Examiner*—Tony M. Argenbright
*Assistant Examiner*—Katrina Harris
(74) *Attorney, Agent, or Firm*—William D. Lanyi (57) ABSTRACT

A cooling system of an outboard motor provides back and forth flow of water from one side of an exhaust passage to the opposite side in order to avoid the creation of stagnant pools of water within which minerals and debris can collect. This result is accomplished by causing the cooling water to flow back and forth from one side of the exhaust passage to the other so that all portions of the water passages are forced to conduct water through them at a relatively high velocity. A water reservoir is formed between an exhaust conduit and an oil reservoir in order to reduce the operating temperature of the oil within the reservoir.

36 Claims, 6 Drawing Sheets

COOLING SYSTEM FOR AN OUTBOARD MOTOR

BACKGROUND OF THE INVENTION

1. Field of the Invention

The present invention is generally related to a cooling system for an outboard motor and, more particularly, to a cooling system that causes cooling water to flow through a reservoir that is in thermal communication with an oil sump and which surrounds a portion of an exhaust conduit.

2. Description of the Related Art

Those skilled in the art of cooling systems of marine propulsion devices and, more particularly, the relationship between the cooling system and both the exhaust and lubricating systems are familiar with many different processes and apparatus for causing cooling water to flow in thermal communication with both the exhaust passage of the outboard motor and the oil reservoir.

U.S. Pat. No. 4,498,875, which issued to Watanabe on Feb. 12, 1985, describes an outboard motor. Water-cooled, four-cycle internal combustion engines are used for outboard motors. In each embodiment described in this patent, an arrangement is provided that offers a compact nature and which uses the coolant delivered to the engine for cooling the oil in the oil pan. In addition, an arrangement is provided whereby the exhaust pipe may pass through the oil pan and yet avoid significant heat transfer from the exhaust system to the lubricating system.

U.S. Pat. No. 4,545,332, which issued to Suzuki et al. on Oct. 8, 1985, describes a water-cooled, four-cycle internal combustion engine for an outboard motor. The engine includes an exhaust arrangement wherein the exhaust gases are returned from the cylinder head to the cylinder block in proximity to a cooling jacket for cooling the exhaust gases before delivery into the lower unit. In addition, the cooling jacket and method of casting the cylinder head provides an opening in which a sacrificial anode may be placed to protect the engine from corrosion, particularly when operated in salt water.

U.S. Pat. No. 5,037,340, which issued to Shibata on Aug. 6, 1991, describes a lubricating device for a four-stroke outboard motor. An external oil reservoir is positioned externally of an engine. The reservoir is contained directly in the power head and in another embodiment, the reservoir is contained externally of the outboard motor. The use of such external positioning of the lubricant reservoirs from the driveshaft housing permits the use of a large expansion chamber for the exhaust system in the driveshaft housing.

U.S. Pat. No. 5,072,809, which issued to Shibata on Dec. 17, 1991, describes a lubricating device for a four-stroke outboard motor. A dry sump lubrication system includes a scavenge pump for drawing lubricant drained from the engine lubricating system through an inlet port and returns it to a dry sump reservoir through an outlet port and a pressure pump that draws lubricant from the dry sump lubricant reservoir through an inlet port and delivers it to the engine lubricating system through an outlet port. At least one of the ports of each of the pumps is positioned above the normal lubricant level in the lubricant reservoir when it is filled with the normal volume of lubricant so as to insure that lubricant will not drain back into the engine when the pump system is not operating.

U.S. Pat. No. 5,232,387, which issued to Sumigawa on Aug. 3, 1993, describes an exhaust device for a four-cycle outboard motor. Coolant is drawn from the body of water within which the watercraft is operated for circulation through the engine cooling system. Subsequently, the coolant is brought into proximity with an exhaust pipe extending downwardly from the engine within an encasing member. After passing downwardly along the exhaust pipe the coolant is finally directed towards an exhaust gas expansion chamber and a cooling water jacket provided around the expansion chamber. In order to prevent any of the cooling water from splashing back up against an oil reservoir, also located within the casing, a cover is provided across the tops of the expansion chamber and its accompanying cooling water jacket.

U.S. Pat. No. 5,462,464, which issued to Ming on Oct. 31, 1995, describes an outboard motor with an oil sump cooling arrangement. A driveshaft housing includes outer sidewalls extending in spaced relation to each other, a forwardly located wall extending between the outer side walls, a rearwardly located wall spaced rearwardly from the forwardly located wall and extending between the outer side walls, and a bottom wall extending between the outer side walls and between the forwardly and rearwardly located walls.

U.S. Pat. No. 5,487,688, which issued to Sumigawa on Jan. 30, 1996, describes an outboard motor having an oil tank that is contained within the driveshaft housing and which is surrounded at least in part by a water cooling jacket for maintaining the oil at an acceptable temperature. The oil tank is formed with a cavity through which an exhaust pipe passes and the area between the exhaust pipe and the oil tank forms, in at least some embodiments, an expansion chamber for silencing the exhaust gases.

U.S. Pat. No. 5,733,157, which issued to Okuzawa et al. on Mar. 31, 1998, describes a four-cycle outboard motor. The exhaust system includes an expansion chamber that is formed in the driveshaft housing of the outboard motor below an oil tank for the engine which is positioned therein. A water chamber is formed around the expansion chamber and the lower portion of the oil tank for cooling them. An above-the-water exhaust gas discharge is provided that communicates with the area above the water jacket.

U.S. Pat. No. 5,803,036, which issued to Takahashi et al. on Sep. 8, 1998, describes an engine for an outboard motor. An upper unit contains an internal combustion engine and a lower unit contains an exhaust guide. The engine has a vertically oriented crankshaft having an end extending from the bottom end of the engine. A flywheel is positioned on the crankshaft at the bottom end of the engine within a recess defined by the exhaust guide. A starter motor is positioned at the bottom end of the engine and is positioned at least partially within the exhaust guide, the motor having a gear for engaging the flywheel to start the engine.

U.S. Pat. No. 5,937,801, which issued to Davis on Aug. 17, 1999, discloses an oil temperature moderator for an internal combustion engine. A cooling system is provided for an outboard motor or other marine propulsion system which causes cooling water to flow in intimate thermal communication with the oil pan of the engine by providing a controlled volume of cooling water at the downstream portion of the water path. As cooling water flows from the outlet of the internal combustion engine, it is caused to pass in thermal communication with the oil pan. Certain embodiments also provide a pressure activated valve which restricts the flow from the outlet of the internal combustion engine to the space near the oil pan. One embodiment of the cooling system also provides a dam within the space adjacent to the outer surface of the oil pan to divide that space into first and second portions. The dam further slows the flow of water as it passes in thermal communication with the oil pan.

U.S. Pat. No. 6,367,442, which issued to Takayanagi on Apr. 9, 2002, describes a four-cycle outboard motor that has a simple construction and a compact design. The outboard motor has a crankshaft disposed substantially vertically within the engine, wherein the rotation of the crankshaft is transmitted to a valve camshaft via a looped member disposed at the bottom of the engine, comprises an oil pump disposed at a position other than the shaft center position of the crankshaft or the camshafts at the bottom of the engine, wherein either this oil sump or a tension adjustor of the looped member is disposed to the inside of the looped member in plan view while the other is disposed outside the looped member in plan view.

U.S. Pat. No. 6,655,341, which issued to Westerbeke on Dec. 2, 2003, describes an oil sump for vertically shafted engines. The sump has a housing with an upper face for sealing against a block of the engine. The sump housing defines an internal volume for containing a quantity of oil received from the engine through an oil drain opening in the upper face of the sump and defines an exhaust inlet for receiving a flow of exhaust from the engine and directing the flow of exhaust toward an exhaust outlet along an exhaust passage defined within the housing. The housing also defines a water inlet for receiving a flow of cooling water into a water passage within the housing about the exhaust passage. The sump also includes means for securely mounting the engine within a boat hull. In some marine applications, seawater or freshwater coolant is discharged into the exhaust gas stream at an attached exhaust elbow.

U.S. Pat. No. 6,699,086, which issued to Belter et al. on Mar. 2, 2004, discloses a coolant management system for a marine propulsion device. The system provides a cavity within a driveshaft housing into which an oil reservoir is disposed. A water pump draws water from a body of water and causes it to flow through various coolant passages of the marine propulsion device. After passing through these coolant passages, the water is directed through a series of containments and compartments so that the level of water within the driveshaft housing varies in depth as a function of the operating speed of the internal combustion engine. This variance in depth causes a varying degree of cooling of the oil within the oil reservoir or sump.

U.S. Pat. No. 6,913,498, which issued to Sheth on Jul. 5, 2005, discloses a marine propulsion system with a polymer composite oil sump structure. A marine propulsion system is made with an oil sump that is a polymer material that is nonanodic and nonmetallic. As a result, the possibility of a galvanic circuit being created within the structure of a driveshaft housing is significantly reduced or eliminated. The result is the enhanced operation of the marine propulsion system without corrosion and the resulting destruction of the internal components within the driveshaft housing.

The patents described above are hereby expressly incorporated by reference in the description of the present invention.

It would be significantly beneficial if a cooling system for an outboard motor could assure that the water flowing through its passages is caused to flow without having stagnant regions where particulates and minerals can precipitate from the cooling water and become attached to the internal surfaces of those passages. In addition, it would be significantly beneficial if the idle relief exhaust passage could be provided without having to form holes radially through the walls of an internally supported exhaust conduit.

SUMMARY OF THE INVENTION

A cooling system for an outboard motor, made in accordance with a preferred embodiment of the present invention, comprises an oil reservoir having a generally vertical cavity formed therein and an exhaust opening formed in the oil reservoir. It further comprises an exhaust gas conduit which has an attachment end and a distal end. The exhaust gas conduit is disposed at least partially within the generally vertical cavity. The exhaust opening and the exhaust gas conduit are disposed in fluid communication with each other to define an exhaust passage extending in a generally downward direction at least partially through the generally vertical cavity. The exhaust gas conduit is shaped to define a space between an outer surface of the exhaust gas conduit and an inner surface of the generally vertical cavity. A preferred embodiment of the present invention further comprises a first water channel formed in the oil reservoir and a second water channel formed in the attachment end of the exhaust gas conduit. A first water transfer passage is formed through a portion of the oil reservoir and disposed in fluid communication between the first and second water channels. A second water transfer passage is formed through a portion of the attachment end of the exhaust gas conduit and disposed in fluid communication between the second water channel and the space between the outer surface of the exhaust gas conduit and the inner surface of the generally vertical cavity. The first and second water transfer passages are disposed on generally opposite sides of the exhaust passage. An adapter plate is configured to support an engine thereon. The oil reservoir is attached to the adapter plate. The adapter plate has an exhaust outlet formed therein. Said exhaust passage is disposed in fluid communication with the exhaust outlet. A third water channel is formed in the adapter plate and disposed in fluid communication with the first water channel.

In a particularly preferred embodiment of the present invention, the first water transfer passage comprises first and second water transfer holes formed through a portion of the oil reservoir and disposed in fluid communication between the first and second water channels. The second water channel comprises first and second grooves formed in the attachment end of the exhaust gas conduit. The first water transfer hole is disposed in fluid communication with the first groove and the second water transfer hole is disposed in fluid communication with the second groove. The second water transfer passage comprises first and second water transfer conduits. The first water transfer conduit is disposed in fluid communication between the first groove and the space and the second water transfer conduit is disposed in fluid communication between the second groove and the space. The first and second water transfer conduits are both disposed on a generally opposite side of the exhaust passage from both the first and second water transfer holes.

In a particularly preferred embodiment of the present invention, the third water channel generally surrounds the exhaust outlet. A water outlet is formed in the adapter plate and disposed in fluid communication with the third water channel. The water outlet and the first water transfer passage are disposed on generally opposite sides of the exhaust passage. The distal end of the exhaust gas conduit is disposed within the central passage and above a lowest portion of the oil reservoir.

A preferred embodiment of the present invention can further comprise a seal member disposed between the outer surface of the exhaust gas conduit and the inner surface of the central passage proximate a bottom portion of the space to form a water reservoir between the exhaust conduit and the oil reservoir. A third water transfer passage extends through the seal member and is disposed in fluid communication with the water reservoir. The space can be generally annular in shape, but alternative configurations of the space and the water reservoir are also within its scope.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

Figure 1:
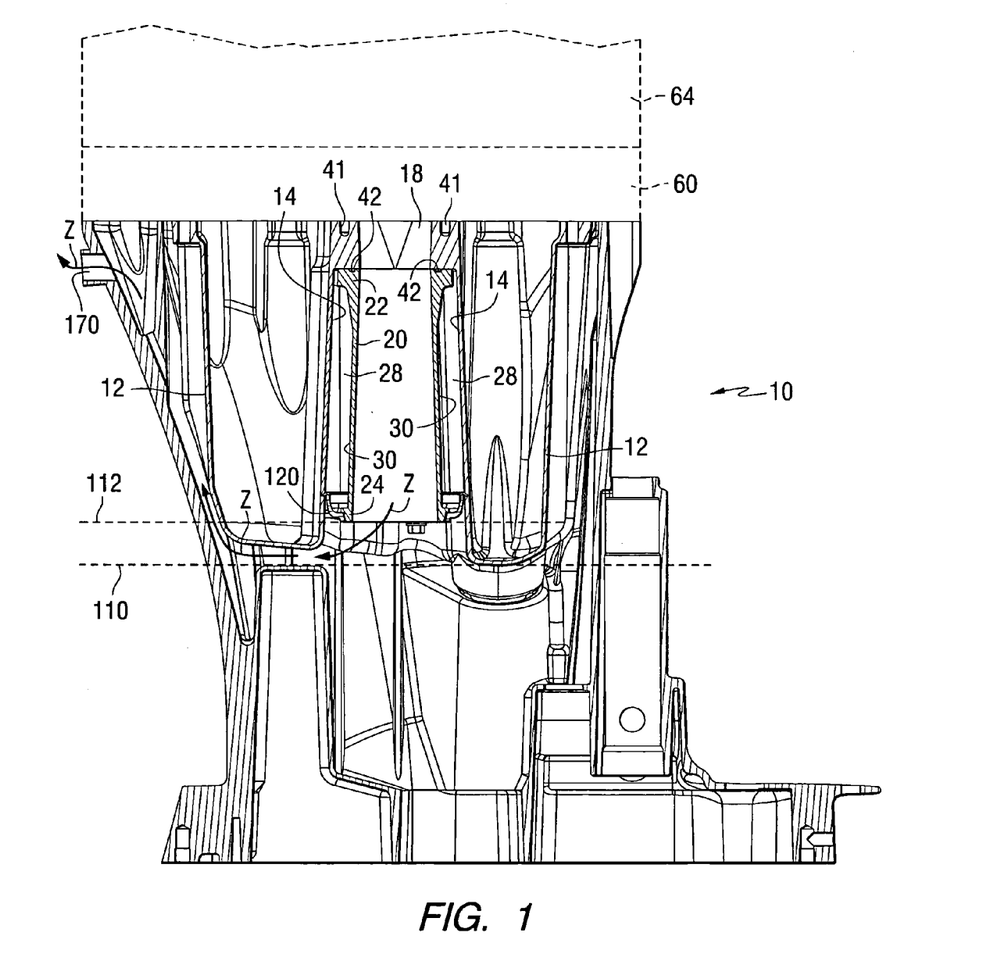
FIG. 1 is a side section view of a driveshaft housing showing an oil reservoir, an exhaust gas conduit, a seal member and both an adapter plate and engine represented by dashed lines.

FIG. 1 is a section view of a driveshaft housing 10 in which an oil reservoir 12 is disposed. The oil reservoir 12 is generally annular in shape with a central passage 14 formed therein. Throughout the description of the present invention, it should be understood that the word "annular" is not limited to components which have a circular cross-section. Instead, this term is used to describe components with shapes that are closed, or nearly closed, and configured to surround, or partially surround, an opening or passage. The sides of the annular components described herein can have generally flat sides.

With continued reference to FIG. 1, an exhaust opening 18 is formed in the oil reservoir 12. An exhaust gas conduit 20 is provided with an attachment end 22 and a distal end 24. The exhaust gas conduit 20 is at least partially disposed within the central passage 14. The exhaust opening 18 and the exhaust gas conduit 20 are disposed in fluid communication with each other to define an exhaust passage extending in a generally downward direction at least partially through the central passage 14. The exhaust gas conduit 20 is shaped to define a space 28 between an outer surface 30 of the exhaust gas conduit 20 and an inner surface of the central passage 14. A first water channel 41 is formed in the oil reservoir 12 as shown in FIG. 1. A second water channel 42 is formed in the attachment end 22 of the exhaust gas conduit 20. A first water transfer passage (not shown in FIG. 1, but identified by reference numeral 51 in FIG. 2) connects the first water channel 41 in fluid communication with the second water channel 42.

Figure 2:
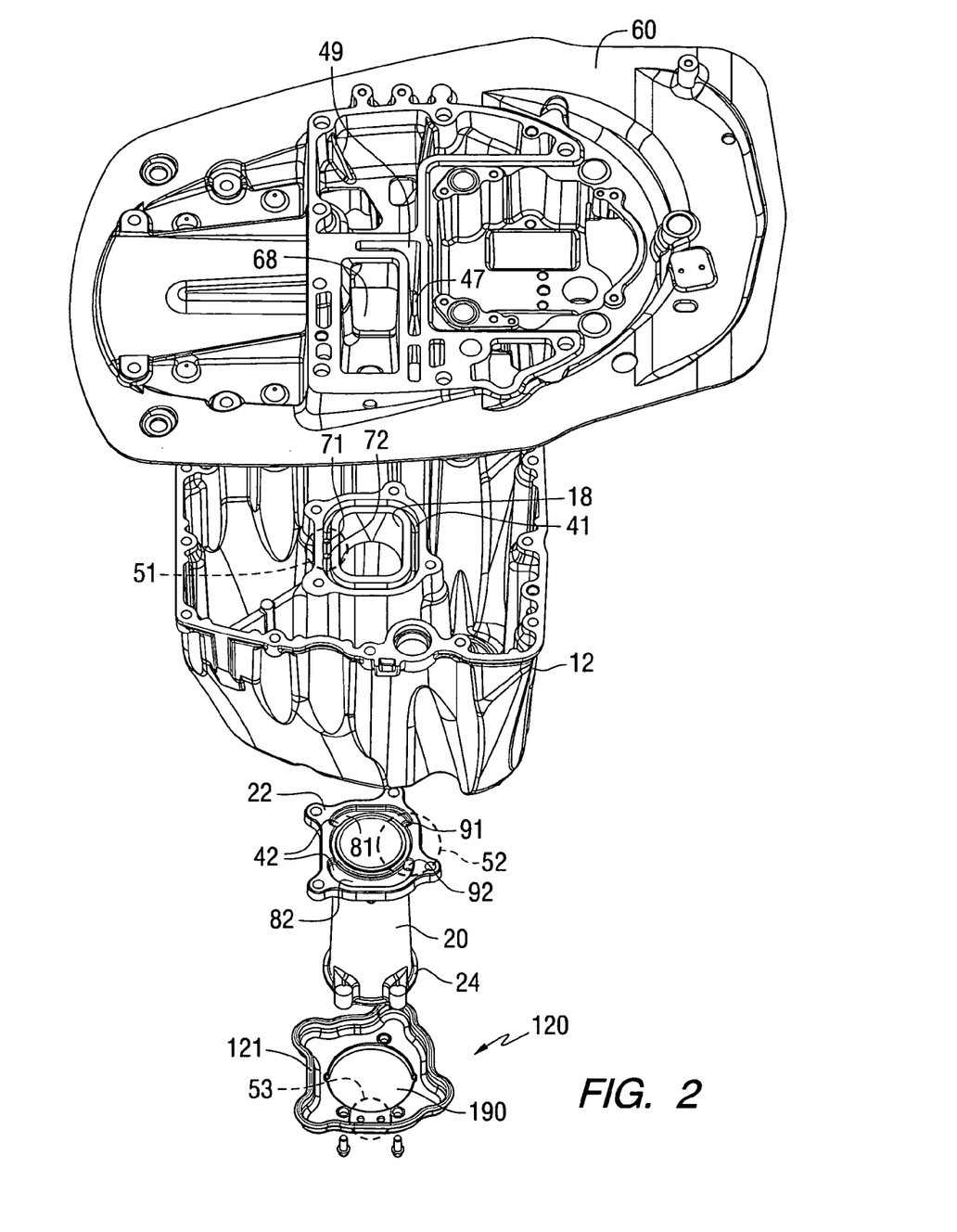
FIG. 2 is an exploded isometric view of an adapter plate, an oil reservoir, an exhaust gas conduit, and a seal member.

FIG. 2 is an exploded isometric view showing the relationships between the oil reservoir 12, the exhaust gas conduit 20 and an adapter plate 60. With continued reference to FIGS. 1 and 2, the first water transfer passage 51 is formed through a portion of the oil reservoir and disposed in fluid communication between the first and second water channels, 41 and 42. A second water transfer passage 52 is formed through a portion of the attachment end 22 of the exhaust gas conduit 20 and disposed in fluid communication between the second water channel 42 and the space 28 between the outer surface 30 of the exhaust gas conduit 20 and the inner surface of the central passage 14 of the oil reservoir 12. The first and second water transfer passages, 51 and 52, are disposed on generally opposite sides of the exhaust passage which extends vertically through the exhaust opening 18 and the internal cavity of the exhaust gas conduit 20.

With continued reference to FIGS. 1 and 2, the adapter plate 60 is configured to support an engine 64 which is represented by dashed lines in FIG. 1. The oil reservoir 12 is attached to the adapter plate 60. The adapter plate 60 has an exhaust outlet formed therein and disposed in fluid communication with the exhaust passage extending through the exhaust opening 18 and the exhaust gas conduit 20. The exhaust outlet is identified by reference numeral 68 in FIG. 2.

Figure 3:
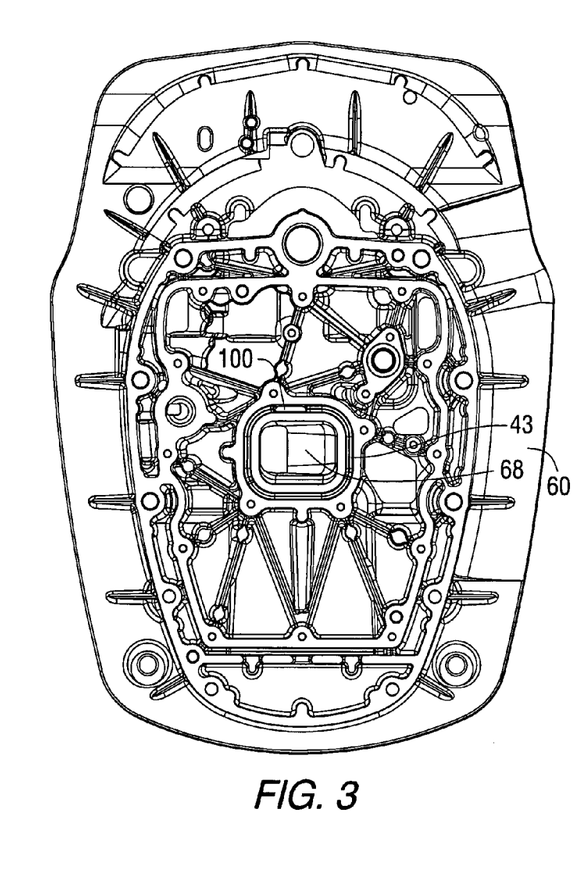
FIGS. 3 and 4 show the bottom and top surfaces of the adapter plate, respectively.
Figure 4:
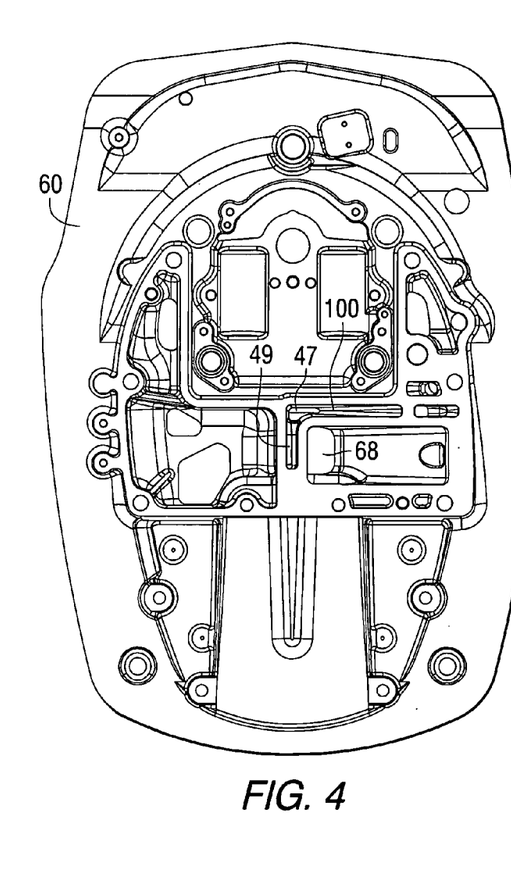

A third water channel 43 is formed in the underside of adapter plate 60 and disposed in fluid communication with the first water channel 41. The third water channel 43 is illustrated in FIG. 3 which is a view of the underside of the adapter plate 60. FIG. 4 shows the top view of the adapter plate 60 which is also shown in FIG. 2. As can be seen in FIG. 3, the third water channel 43 generally surrounds the exhaust outlet 68 which extends through the adapter plate 60.

With continued reference to FIGS. 1–4, the first water transfer passage 51, as illustrated in FIG. 2, can comprise first and second water transfer holes, 71 and 72, formed through the portion of the oil reservoir 12 and disposed in fluid communication between the first and second water channels, 41 and 42. In addition, as also illustrated in FIG. 2, the second water channel 42 comprises first and second grooves, 81 and 82, which are formed in the attachment end 22 of the exhaust gas conduit 20. The first water transfer hole 71 is disposed in fluid communication with the first groove 81 and the second water transfer hole 72 is disposed in fluid communication with the second groove 82. The second water transfer passage 52, which is also illustrated in FIG. 2, comprises first and second water transfer conduits, 91 and 92. The first water transfer conduit 91 is disposed in fluid communication between the first groove 81 and the space 28. The second water transfer conduit 92 is disposed in fluid communication between the second groove 82 and the space 28. The first and second water transfer conduits, 91 and 92, are both disposed on a generally opposite side of the exhaust passage from both the first and second water transfer holes, 71 and 72. A water outlet 100 is formed in the adapter plate 60, as shown in FIGS. 3 and 4, and disposed in fluid communication with the third water channel 43. The water outlet 100 and the first water transfer passage 51 are disposed on generally opposite sides of the exhaust passage.

With reference to FIGS. 1 and 2, the distal end 24 of the exhaust gas conduit 20 is shown disposed within the central passage 14 and above the lowest portion of the oil reservoir 12. In order to illustrate this relationship, the lowest portion of the oil reservoir is represented by dashed line 110 and the position of the distal end 24 of the exhaust conduit 20 is represented by dashed line 112. As can be seen, the distal end 24 is disposed above the lowest portion of the oil reservoir 12.

A seal member 120, as illustrated in FIGS. 1 and 2, is disposed between the outer surface 30 of the exhaust gas conduit 20 and the inner surface of the central passage 14 proximate a bottom portion of the space 28 to form a water reservoir within a portion of the space 28 between the exhaust gas conduit 20 and the oil reservoir 12.

Figures 5, 6, 7:
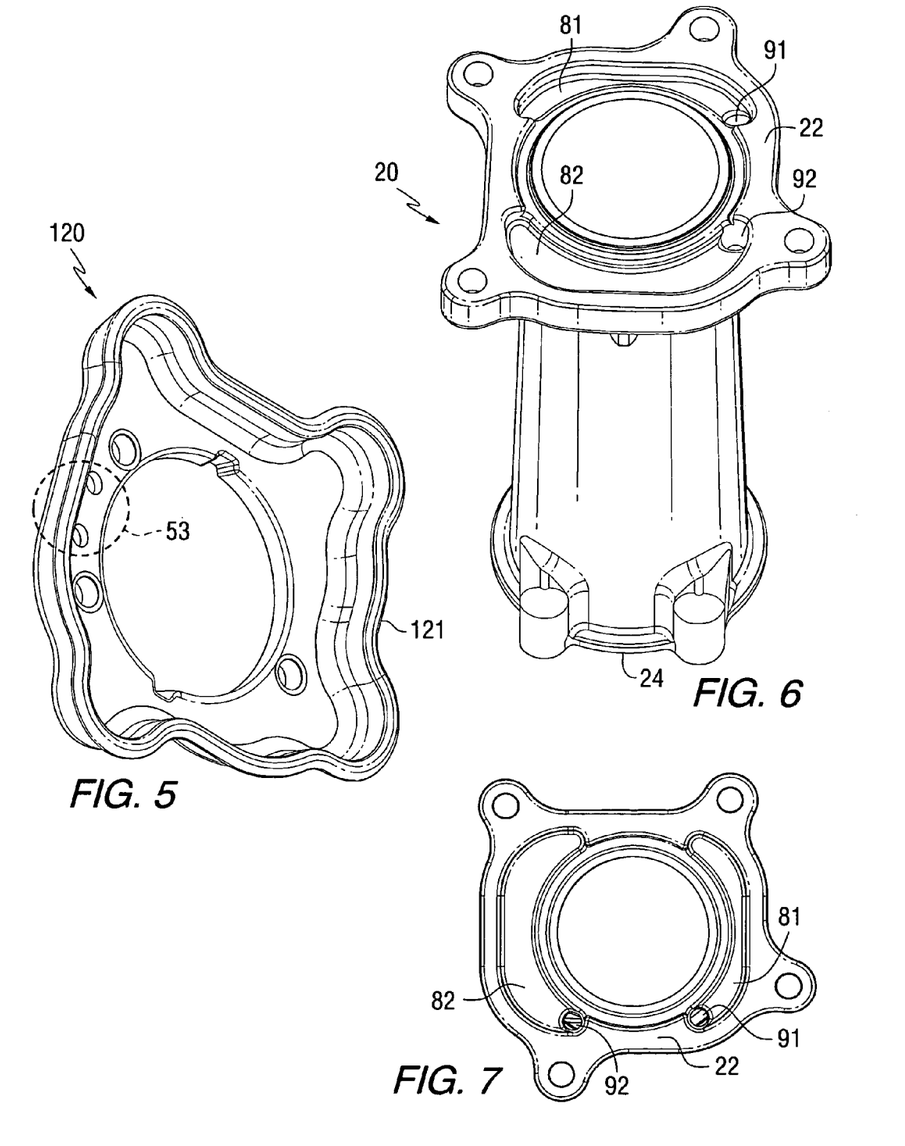
FIG. 5 is an isometric view of the seal member.
FIGS. 6 and 7 are two views of the exhaust conduit.

FIG. 5 is an isometric illustration of the seal member 120. A third water transfer passage 53 extends through the seal member 120, as illustrated in FIG. 5, and is disposed in fluid communication with the water reservoir formed in the space 28 as a result of water passing downwardly through the first and second water transfer passages, 51 and 52, and collecting in the space 28. With reference to FIGS. 1, 2 and 5, the seal member 120 is made of plastic in a particularly preferred embodiment of the present invention. The outer edge 121 of the seal member 120 can be made of a rubber material which is disposed in contact with the inner surface of the central passage 14 of the oil reservoir 12.

FIG. 6 is an isometric view of the exhaust gas conduit 20 and FIG. 7 is a top view of the attachment end 22 of the exhaust gas conduit. The second water transfer passage, identified by reference numeral 52 in FIG. 2, comprises the first and second water transfer conduits, 91 and 92, which are illustrated in FIGS. 6 and 7. Similarly, the first and second grooves, 81 and 82, which form the second water channel 42, are illustrated in FIGS. 6 and 7.

One of the significant advantages of the present invention is that it causes the water flow within the cooling system to travel back and forth, from one side of the exhaust passage to the other, as the water moves downwardly through the various water channels and water transfer passages. With reference to FIGS. 1 and 2, the water traveling from the engine 64 is directed downwardly through the water outlet 47 formed in the adapter plate 60 after passing through the L-shaped cavity 49, as illustrated in FIG. 2. The water outlet 47 directs water into the third water channel 43, which is illustrated in FIG. 3, after it passes through the third water transfer conduit 100 which is also shown in FIG. 3. This water then flows into and fills the first water channel 41 which is shown in FIGS. 1 and 2. Since the first water transfer passage 51, which comprises the first and second water transfer holes, 71 and 72, is located on an opposite side of the exhaust passage, the water must flow through all portions of the first water channel 41 from the point where it flows out of the third water transfer conduit 100 into the first water channel 41 to the point where it flows out of the first water channel 41, through the first water transfer passage 51, down into the first and second grooves, 81 and 82, of the second water channel 42 formed in the attachment end 22 of the exhaust gas conduit 20. Then, the water is forced to flow, in a direction from left to right in FIG. 2, toward the first and second water transfer conduits, 91 and 92, shown on the right side of the exhaust passage in FIG. 2. This back and forth flow discourages the formation of stagnant pools of water that could otherwise allow minerals and debris to be deposited within the various water passages. This back and forth flow of coolant water flowing from the engine 64 begins on the right side of the exhaust passage in FIG. 2 at the water outlet 47 shown in the top surface of the adapter plate 60 in FIG. 2 which is coincident with the third water transfer conduit 100 formed through the adapter plate 60 and extending through its bottom surface as illustrated in FIG. 3. From that right side of the exhaust passage, with reference to FIG. 2, the water must flow to the opposite side (toward the left in FIG. 2) of the exhaust passage through the first water channel 41 toward the first water transfer passage 51. From there it flows down into the first and second grooves, 81 and 82, through which the water must then pass back to the right side of the exhaust passage to enter the second water transfer passage 52 which comprises the first and second water transfer conduits, 91 and 92, on the right side of the exhaust passage. As the water passes through the second water transfer passage 52, it flows downwardly into the reservoir formed in the space 28 which is identified in FIG. 1. This back and forth flow of water encourages the flow of coolant through all portions of the cooling system contained within the driveshaft housing of an outboard motor.

Figure 8:
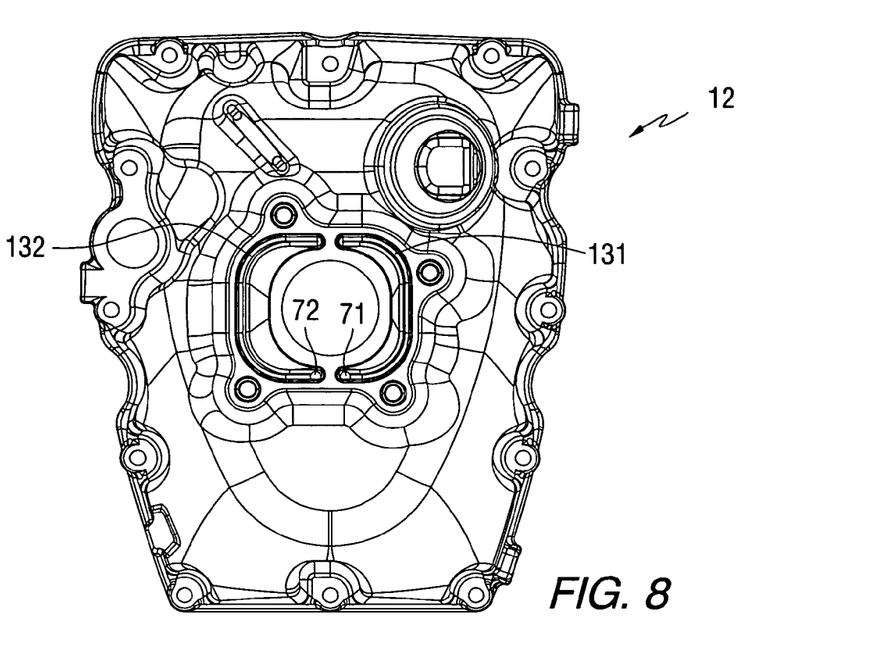
FIGS. 8 and 9 show the oil reservoir in a bottom view and top view, respectively.
Figure 9:
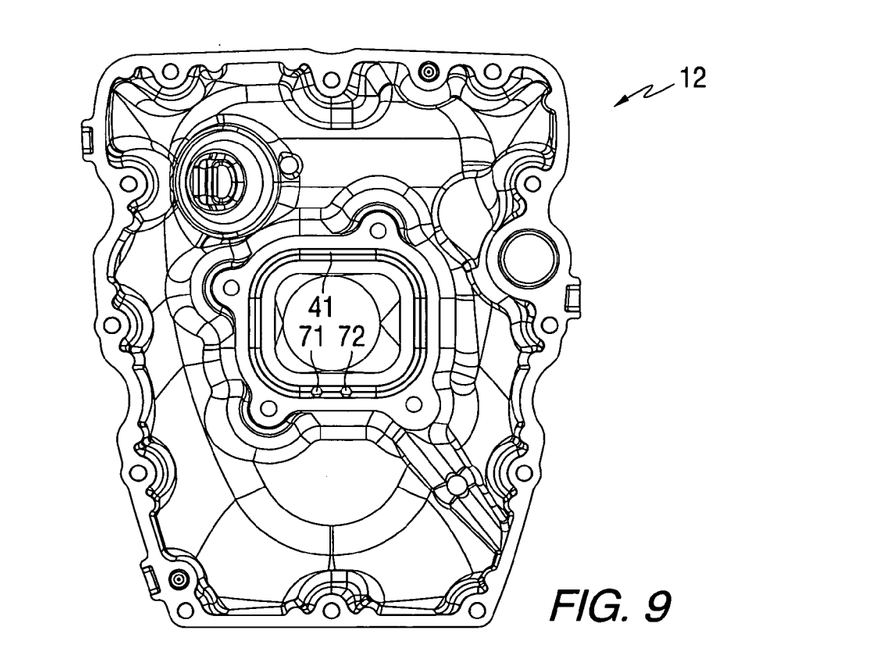

FIG. 8 is a bottom view of the oil reservoir 12 and FIG. 9 is a top view of the water reservoir 12. It can be seen that FIG. 9 shows the upper surfaces of the oil reservoir 12 illustrated in FIG. 2. With reference to FIGS. 2, 8 and 9, the first water channel 41 is shown with the first and second water transfer holes, 71 and 72, formed within it. In FIG. 8, these water transfer holes, 71 and 72, are shown passing through the bottom surface of the oil reservoir 12. The two grooves, 131 and 132, formed in the undersurface of the oil reservoir 12, as shown in FIG. 8, are configured to be aligned with the first and second grooves, 81 and 82, formed in the upper surface of the attachment end 22 of the exhaust gas conduit 20 which are illustrated in FIGS. 2, 6 and 7.

Figure 10:
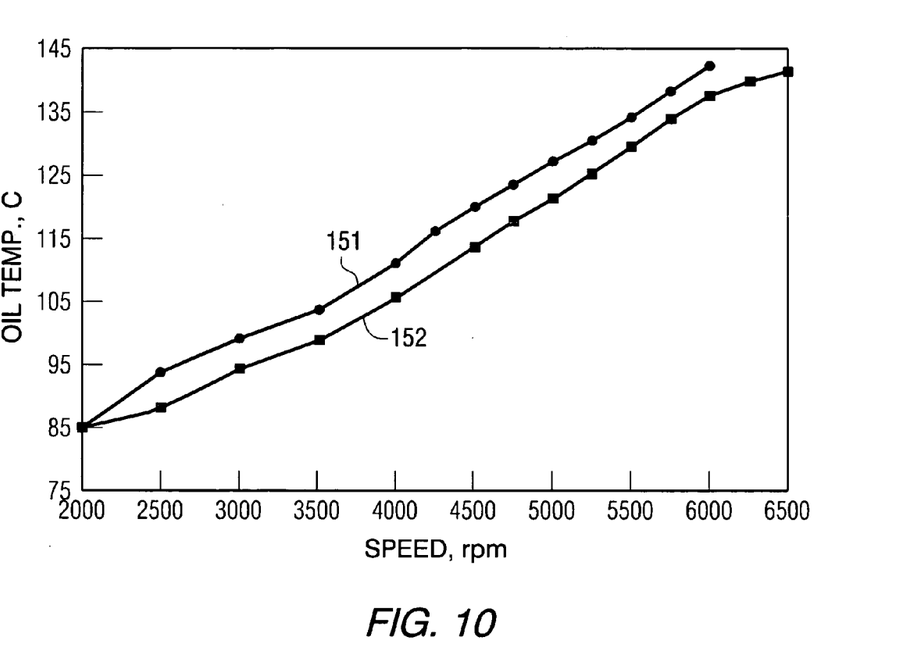
FIG. 10 is a graphical representation showing the beneficial effect on the oil temperature resulting from the present invention.

FIG. 10 is a graphical illustration of the beneficial effect provided by the reservoir of cooling water, within space 28 between the outer surface 30 of the exhaust gas conduit 20 and the inner surface of the central passage 14. The graphical representation in FIG. 10 illustrates the decrease in the oil temperature within the oil reservoir 12 that results from the provision of this water reservoir. Line 151 represents the oil temperature, as a function of engine speed, in an oil system not employing the advantages of the present invention, but cooled with spray cooling within space 28. Line 152 shows the oil temperature, over a range of engine speeds, when the water reservoir within space 28 is provided. As can be seen, the provision of the water reservoir within space 28 has a beneficial effect throughout the entire range of engine speeds because the oil is cooler as a result of the provision of the water reservoir within space 28.

Another advantage of the structure of the present invention results from the fact that the distal end 24 of the exhaust gas conduit 20 is located above the lowest portion of the oil reservoir 12, as illustrated by dashed lines 110 and 112 in FIG. 1. Known designs of outboard motor exhaust systems typically have an exhaust gas conduit which extends downwardly past the lowest portion of the oil reservoir. One example of that type of known structure is shown in U.S. Pat. No. 5,232,387 which illustrates the distal end of the exhaust pipe (reference numeral 40 in U.S. Pat. No. 5,232,387) extending far below the lowest portion of the oil pan (reference numeral 30 in U.S. Pat. No. 5,232,387). In that type of known structure, it is often necessary to provide a radial hole through an upper surface of the exhaust gas conduit to allow exhaust gas, when the engine is operating at idle speed, to flow out of the exhaust gas conduit at a position higher than its distal end. Otherwise, water located below and in contact with the lower portions of the oil reservoir 12 provides sufficient pressure to inhibit the flow of exhaust gas from the distal end of the exhaust gas conduit because it is located below the surface of that water. This condition is altered by the higher position of the distal end 24 of the exhaust gas conduit 20 of the present invention. As a result, no additional holes are required to allow exhaust gas to escape from an upper of the exhaust gas conduit. The normal flow of exhaust gas through the exhaust gas passage and out of the distal end 24 of the exhaust gas conduit allows the exhaust to flow out of the distal end 24 of the exhaust gas conduit 20 against a much lower back pressure caused by the water above the distal end of the exhaust conduit 20, as illustrated by arrows Z, and pass in a direction toward the idle relief exhaust 170 as illustrated in FIG. 1.

With reference to FIGS. 1–10, it can be seen that a cooling system for an outboard motor made in accordance with the preferred embodiment of the present invention comprises an oil reservoir 12 having a central passage 14 formed therein. It also comprises an exhaust opening 18 formed in the oil reservoir 12. An exhaust gas conduit 20 has an attachment end 22 and a distal end 24. The exhaust gas conduit 20 is disposed at least partially within the central passage 14. The exhaust opening 18 and the exhaust gas conduit 20 are disposed in fluid communication with each other to define an exhaust passage extending in a generally downward direction at least partially through the central passage 14. The exhaust gas conduit 20 is shaped to define a space 28 between an outer surface 30 of the exhaust gas conduit 20 and an inner surface of the central passage 14. A first water channel 41 is formed in the oil reservoir 12 and a second water channel 42 is formed in the attachment end 22 of the exhaust gas conduit 20. A first water transfer passage 51 is formed through a portion of the oil reservoir 12 and disposed in fluid communication between the first and second water channels, 41 and 42. A second water transfer passage 52 is formed through a portion of the attachment end 22 of the exhaust gas conduit 20 and disposed in fluid communication between the second water channel 42 and the space 28 between the outer surface 30 of the exhaust gas conduit 20 and the inner surface of the central passage 14. The first and second water transfer passages, 51 and 52, are disposed on generally opposite sides of the exhaust passage. A particularly preferred embodiment of the present invention further comprises an adapter plate 60 which is configured to support an engine 64 thereon. In FIG. 1, the adapter plate 60 and the engine 64 are illustrated schematically and represented by dashed lines to show the relative positions of these components. The oil reservoir 12 is attached to the adapter plate 60 and the adapter plate 60 has an exhaust outlet 68 formed therein. The exhaust passage is disposed in fluid communication with the exhaust outlet. In FIG. 2, the exhaust passage includes the exhaust outlet 68, the exhaust opening 18, the central cylindrical passage within the exhaust gas conduit 20, and the central opening 190 which is formed through the seal member 120. A third water channel 43 is formed in the adapter plate 60 and disposed in fluid communication with the first water channel 41. The third water channel 43 generally surrounds the exhaust outlet 68. The first water transfer passage 51 comprises first and second water transfer holes, 71 and 72, formed through the portion of the oil reservoir 12 and disposed in fluid communication between the first and second water channels, 41 and 42. The second water channel 42 comprises first and second grooves, 81 and 82, formed in the attachment end-22 of the exhaust gas conduit 20. The first water transfer hole 91 is disposed in fluid communication with the first groove 81 and the second water transfer hole 92 is disposed in fluid communication with the second groove 82. The second water transfer passage 52 comprises first and second water transfer conduits, 91 and 92. The first water transfer conduit 91 is disposed in fluid communication between the first groove 81 and the space 28. The second water transfer conduit 92 is disposed in fluid communication between the second groove 82 and the space 28. The first and second water transfer conduits, 91 and 92, are both disposed on a generally opposite side of the exhaust passage from both the first and second water transfer holes, 71 and 72, of the first water transfer passage 51. A water outlet 100 is formed in the adapter plate 60 and disposed in fluid communication with the third water channel 43. The water outlet 100 and the first water transfer passage 51 are disposed on generally opposite sides of the exhaust passage. The distal end 24 of the exhaust gas conduit 20 is disposed within the central passage 14 and above the lowest portion of the oil reservoir 12, as represented by the distance between dashed lines 110 and 112 in FIG. 1. A seal member 120 is disposed between the outer surface 30 of the exhaust gas conduit 20 and the inner surface of the central passage 14 proximate a bottom portion of the space 28 to form a water reservoir within the space 28 between the exhaust gas conduit 20 and the oil reservoir 12. A third water transfer passage 53 extends through the seal member 20 and is disposed in fluid communication with the water reservoir within space 28. The seal member 120 is made of plastic in a preferred embodiment of the present invention and has an outer edge 121 which is made of a rubber material in a preferred embodiment of the present invention and disposed in contact with the inner surface of the central passage 14. The space 28 is generally annular in a preferred embodiment of the present invention.

Although the present invention has been described with particular specificity and illustrated to show a preferred embodiment, it should be understood that alternative embodiments are also within its scope.

We claim:

1. A cooling system for an outboard motor, comprising:
an oil reservoir having a central passage formed therein;
an exhaust opening formed in said oil reservoir;
an exhaust gas conduit having an attachment end and a distal end, said exhaust gas conduit being disposed at least partially within said central passage, said exhaust opening and said exhaust gas conduit being disposed in fluid communication with each other to define an exhaust passage extending in a generally downward direction at least partially through said central passage, said exhaust gas conduit being shaped to define a space between an outer surface of said exhaust gas conduit and an inner surface of said central passage;
a first water channel formed in said oil reservoir;
a second water channel formed in said attachment end of said exhaust gas conduit;
a first water transfer passage formed through a portion of said oil reservoir and disposed in fluid communication between said first and second water channels; and
a second water transfer passage formed through a portion of said attachment end of said exhaust gas conduit and disposed in fluid communication between said second water channel and said space between said outer surface of said exhaust gas conduit and said inner surface of said central passage, said first and second water transfer passages being disposed on generally opposite sides of said exhaust passage.

2. The system of claim 1, further comprising:
an adapter plate configured to support an engine thereon, said oil reservoir being attached to said adapter plate, said adapter plate having an exhaust outlet formed therein, said exhaust passage being disposed in fluid communication with said exhaust outlet.

3. The system of claim 2, further comprising:
a third water channel formed in said adapter plate and disposed in fluid communication with said first water channel.

4. The system of claim 3, wherein:
said third water channel generally surrounds said exhaust outlet.

5. The system of claim 3, further comprising:
a water outlet formed in said adapter plate and disposed in fluid communication with said third water channel.

6. The system of claim 5, wherein:
said water outlet and said first water transfer passage are disposed on generally opposite sides of said exhaust passage.

7. The system of claim 1, wherein:
said first water transfer passage comprises first and second water transfer holes formed through said portion of said oil reservoir and disposed in fluid communication between said first and second water channels.

8. The system of claim 7, wherein:
said second water channel comprises first and second grooves formed in said attachment end of said exhaust gas conduit.

9. The system of claim 8, wherein:
said first water transfer hole is disposed in fluid communication with said first groove and said second water transfer hole is disposed in fluid communication with said second groove.

10. The system of claim 9, wherein:
said second water transfer passage comprises first and second water transfer conduits.

11. The system of claim 10, wherein:
said first water transfer conduit is disposed in fluid communication between said first groove and said space and said second water transfer conduit is disposed in fluid communication between said second groove and said space.

12. The system of claim 11, wherein:
said first and second water transfer conduits are both disposed on a generally opposite side of said exhaust passage from both said first and second water transfer holes.

13. The system of claim 1, wherein:
said distal end of said exhaust gas conduit is disposed within said central passage and above a lowest portion of said oil reservoir.

14. The system of claim 1, further comprising:
a seal member disposed between said outer surface of said exhaust gas conduit and said inner surface of said central passage proximate a bottom portion of said space to form a water reservoir between said exhaust gas conduit and said oil reservoir; and
a third water transfer passage extending through said seal member and disposed in fluid communication with said water reservoir.

15. The system of claim 14, wherein:
said seal member is made of plastic.

16. The system of claim 15, wherein:
an outer edge of said seal member is made of a rubber material which is disposed in contact with said inner surface of said central passage.

17. The system of claim 1, wherein:
said space is generally annular in shape.

18. A cooling system for an outboard motor, comprising:
an oil reservoir having a central passage formed therein;
an exhaust opening formed in said oil reservoir;
an exhaust gas conduit having an attachment end and a distal end, said exhaust gas conduit being disposed at least partially within said central passage, said exhaust opening and said exhaust gas conduit being disposed in fluid communication with each other to define an exhaust passage extending in a generally downward direction at least partially through said central passage, said exhaust gas conduit being shaped to define a space between an outer surface of said exhaust gas conduit and an inner surface of said central passage, said attachment end of said exhaust gas conduit being attached to said oil reservoir, said distal end of said exhaust gas conduit being disposed within said central passage and above a lowest portion of said oil reservoir;
a first water channel formed in said oil reservoir;
a second water channel formed in said attachment end of said exhaust gas conduit;
a first water transfer passage formed through a portion of said oil reservoir and disposed in fluid communication between said first and second water channels;
a second water transfer passage formed through a portion of said attachment end of said exhaust gas conduit and disposed in fluid communication between said second water channel and said space between said outer surface of said exhaust gas conduit and said inner surface of said central passage;
an adapter plate configured to support an engine thereon, said oil reservoir being attached to said adapter plate, said adapter plate having an exhaust outlet formed therein, said exhaust passage being disposed in fluid communication with said exhaust outlet;
a third water channel formed in said adapter plate and disposed in fluid communication with said first water channel;
a seal member disposed between said outer surface of said exhaust gas conduit and said inner surface of said central passage proximate a bottom portion of said space to form a water reservoir between said exhaust gas conduit and said oil reservoir; and
a third water transfer passage extending through said seal member and disposed in fluid communication with said water reservoir.

19. The system of claim 18, wherein:
said first and second water transfer passages are disposed on generally opposite sides of said exhaust passage.

20. The system of claim 18, wherein:
said third water channel generally surrounds said exhaust outlet.

21. The system of claim 18, wherein:
said first water transfer passage comprises first and second water transfer holes formed through said portion of said oil reservoir and disposed in fluid communication between said first and second water channels.

22. The system of claim 21, wherein:
said second water channel comprises first and second grooves formed in said attachment end of said exhaust gas conduit.

23. The system of claim 22, wherein:
said first water transfer hole is disposed in fluid communication with said first groove and said second water transfer hole is disposed in fluid communication with said second groove.

24. The system of claim 23, wherein:
said second water transfer passage comprises first and second water transfer conduits.

25. The system of claim 24, wherein:
said first water transfer conduit is disposed in fluid communication between said first groove and said space and said second water transfer conduit is disposed in fluid communication between said second groove and said space.

26. The system of claim 25, wherein:
said first and second water transfer conduits are both disposed on a generally opposite side of said exhaust passage from both said first and second water transfer holes.

27. The system of claim 26, further comprising:
a water outlet formed in said adapter plate and disposed in fluid communication with said third water channel.

28. The system of claim 27, wherein:
said water outlet and said first water transfer passage are disposed on generally opposite sides of said exhaust passage.

29. A cooling system for an outboard motor, comprising:
an oil reservoir having a central passage formed therein;
an exhaust opening formed in said oil reservoir;
an exhaust gas conduit having an attachment end and a distal end, said exhaust gas conduit being disposed at least partially within said central passage, said exhaust opening and said exhaust gas conduit being disposed in fluid communication with each other to define an exhaust passage extending in a generally downward direction at least partially through said central passage, said exhaust gas conduit being shaped to define a space between an outer surface of said exhaust gas conduit and an inner surface of said central passage;
a first annular water channel formed in said oil reservoir;
a second annular water channel formed in said attachment end of said exhaust gas conduit;
a first water transfer passage formed through a portion of said oil reservoir and disposed in fluid communication between said first and second annular water channels;
a second water transfer passage formed through a portion of said attachment end of said exhaust gas conduit and disposed in fluid communication between said second annular water channel and said space between said outer surface of said exhaust gas conduit and said inner surface of said central passage, said first and second water transfer passages being disposed on generally opposite sides of said exhaust passage;
an adapter plate configured to support an engine thereon, said oil reservoir being attached to said adapter plate, said adapter plate having an exhaust outlet formed therein, said exhaust passage being disposed in fluid communication with said exhaust outlet;
a third annular water channel formed in said adapter plate and disposed in fluid communication with said first annular water channel; and
said first water transfer passage comprises first and second water transfer holes formed through said portion of said oil reservoir and disposed in fluid communication between said first and second annular water channels, said second annular water channel comprising first and second grooves formed in said attachment end of said exhaust gas conduit, said first water transfer hole being disposed in fluid communication with said first groove and said second water transfer hole being disposed in fluid communication with said second groove, said second water transfer passage comprising first and second water transfer conduits, said first water transfer conduit being disposed in fluid communication between said first groove and said space and said second water transfer conduit being disposed in fluid communication between said second groove and said space, said first and second water transfer conduits being both disposed on a generally opposite side of said exhaust passage from both said first and second water transfer holes.

30. The system of claim 29, wherein:
said space is generally annular in shape.

31. The system of claim 30, wherein:
said third annular water channel generally surrounds said exhaust outlet.

32. The system of claim 31, further comprising:
a water outlet formed in said adapter plate and disposed in fluid communication with said third annular water channel.

33. The system of claim 32, wherein:
said water outlet and said first water transfer passage are disposed on generally opposite sides of said exhaust passage.

34. The system of claim 33, wherein:
said distal end of said exhaust gas conduit is disposed within said central passage and above a lowest portion of said oil reservoir.

35. The system of claim 29, further comprising:
a seal member disposed between said outer surface of said exhaust gas conduit and said inner surface of said central passage proximate a bottom portion of said space to form a water reservoir between said exhaust gas conduit and said oil reservoir; and
a third water transfer passage extending through said seal member and disposed in fluid communication with said water reservoir.

36. The system of claim 29, wherein:
said space is generally annular in shape.

* * * * *